W. E. WILLIAMS.
MOVING PICTURE FILM.
APPLICATION FILED JULY 29, 1913.
1,236,639.
Patented Aug. 14, 1917.
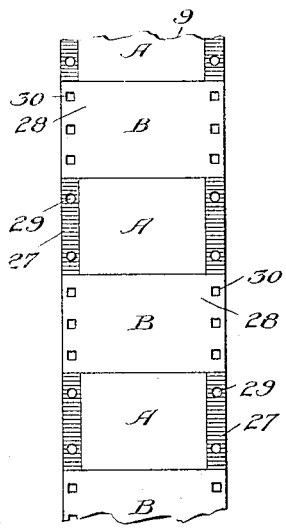
Witnesses
Edwin L. Bradford
Robert Craig Greene
Inventor
William E. Williams
By Wallace Greene,
Attorney

UNITED STATES PATENT OFFICE.

WILLIAM ERASTUS WILLIAMS, OF CHICAGO, ILLINOIS.

MOVING-PICTURE FILM.

1,236,639.   Specification of Letters Patent.   Patented Aug. 14, 1917.

Application filed July 29, 1913. Serial No. 781,760.

*To all whom it may concern:*

Be it known that I, WILLIAM ERASTUS WILLIAMS, a citizen of the United States, residing at Chicago, in the county of Cook and State of Illinois, with a post-office address at 331 South Clinton street, have invented a new and useful Improvement in Moving-Picture Films, of which the following is a specification.

This invention relates to series picture films adapted to be used with alternately acting, distinct exposure devices, the consecutively exposed picture areas on the film being separated by other picture areas. An object of the invention is to mark the film in such manner that the operator may instantly determine, independently of differences in the pictures themselves, the exposure device to which any picture should be assigned. Another object is to make it impossible that a given picture should be exposed by the wrong device, and a further object is to facilitate accurate registry of the pictures when pictures exposed by the different exposure devices are projected upon the same screen area.

In the accompanying drawing, one face of a portion of the novel film is shown.

In this view, the set of pictures to be presented to one of two exposing or projecting devices are designated by A and the pictures alternating with the pictures of the first set and to be presented to the other exposing devices are marked B.

Practically, the exposure points must be at some distance apart and hence pictures immediately following each other upon the film do not immediately follow each other upon the screen.

The pictures of one of the two sets are distinguished from those of the other set by marginal perforations differing in shape from the perforations alongside the pictures of the other set, and for illustration those of one set are shown as round while those of the other set are represented as square, the teeth of the feeding drums corresponding, of course, to the shapes selected. That no segment of the film can possibly be engaged with the wrong set of teeth, the perforations of one set are made to differ materially in spacing from those of the other set. Preferably, the picture bearing segments of one set are provided with sharply defined areas which differ from corresponding areas on the remaining segments in the amount or character of the light passing therefrom to the eye of an observer, as by being shaded as indicated at 27, so the eye may readily assign any picture to the proper set; and further, owing to the sharp definition of the shaded areas, bringing the pictures of the two sets into exact registry upon the screen is facilitated, it being understood that the shaded areas are temporarily exposed at the gate so that they show upon the screen. If any given area A be thrown upon the screen and at the same time an area B at some distance therefrom upon the film be also thrown upon the same part of the screen, the marginal portions or boundaries of the two areas or film segments will coincide if registration is perfect but will be strikingly out of coincidence if registration be not substantially perfect.

As the term is herein used "shade" relates to the intensity or character of light passing to the eye, whereby different areas differing in shade are clearly distinguished by the eye.

The word "segment" as applied to a film herein designates a lineally short portion of a relatively very long film of comparatively slight width.

What I claim is:

1. A moving picture film bearing a set of pictures separated by pictures of a different set and having on the picture-bearing segments like located, sharply defined areas of a shade materially different from that of corresponding areas of the segments bearing pictures of the other set.

2. A picture film having alongside certain of its pictures marginal corresponding perforations differently spaced from the perforations alongside its other pictures, whereby neither can be engaged by the feeding-sprocket-drum teeth adapted to engage the other.

3. A picture film having a certain set of its picture bearing segments distinguished from all other segments by sharply defined marginal areas of a shade widely different from the shade of the corresponding areas of said other segments.

4. A picture film bearing a set of pictures alternating with pictures of another set and having in their lateral marginal portions photographic marks which when projected upon a screen may be accurately adjusted between companion marks projected with a picture, of the other set, lying between said companion marks.

In witness whereof I have hereunto subscribed my name in the city of Chicago and State of Illinois on this 3rd day of February 1913 in the presence of two subscribing witnesses.

WILLIAM ERASTUS WILLIAMS.

Witnesses:
August C. Riechers,
Geo. E. Miller.